United States Patent [19]
Gerlitz

[11] Patent Number: 4,930,868
[45] Date of Patent: Jun. 5, 1990

[54] COMBINER FOR OPTICAL OR ELECTRO-OPTICAL SYSTEMS

[75] Inventor: Jonathan Gerlitz, Herzelia, Israel

[73] Assignee: Sofin Ltd., Tel-Aviv, Israel

[21] Appl. No.: 256,153

[22] Filed: Oct. 11, 1988

Related U.S. Application Data

[63] Continuation of Ser. No. 923,566, Oct. 27, 1986, abandoned.

[30] Foreign Application Priority Data

Dec. 16, 1985 [IL] Israel ......................................... 77354

[51] Int. Cl.$^5$ .......................... G02B 5/32; G02B 27/10
[52] U.S. Cl. ...................................... 350/3.7; 350/171
[58] Field of Search ......................... 350/3.7, 171, 174

[56] References Cited

U.S. PATENT DOCUMENTS 2,672,502  3/1954  Albright .............................. 350/169
4,024,341  5/1977  Takahashi .......................... 358/148

Primary Examiner—Rodney B. Bovernick
Assistant Examiner—Ronald M. Kachmarik
Attorney, Agent, or Firm—Benjamin J. Barish

[57] ABSTRACT

A beam splitter combining the optical apertures of at least three optical (or electro-optical) devices to one optical aperture with respect to a beam of electromagnetic radiation passing therethrough, comprises a dichroic member effective to reflect part of the spectral range of the electromagnetic radiation and to transmit the remainder therethrough; and a grid effective to refract a narrow bandwidth of the electromagnetic radiation and to transmit the remaining electromagnetic radiation therethrough.

11 Claims, 1 Drawing Sheet

COMBINER FOR OPTICAL OR ELECTRO-OPTICAL SYSTEMS

This application is a continuation. of application Ser. No. 06/923,566 filed Oct. 27, 1986, now abandoned.

BACKGROUND OF THE INVENTION

The present invention relates to a combiner for combining the optical apertures of three or more optical (which term includes electro-optical) systems. The invention also relates to optical systems including such combiner.

In many systems used for field observation and/or measurement, a simultaneous operation of several optical and electro-optical devices is required. An example of such a system is one including a thermal imaging sensor, a laser rangefinder, and a TV camera and optics, all simultaneously operating using separate spectral ranges of electromagnetic radiation.

Two methods are commonly used at the present time for the steering of the line of sight (LOS) of an optical or electro-optical device. One method involves mounting all the optical or electro-optical devices on a gimballed system and controlling the gimbals. A second method involves the use of a mirror as a steering device of the LOS. The latter method may involve mounting the optical and electro-optical devices side by side, with parallel optical axes, in which case the mirror must be large enough to include all the optical apertures; or may involve combining the optical apertures of the devices sequentially, using dichroic beam splitters. In the latter case, a common aperture may be used, but the length of the optical path and the individual field of view of each device may cause the common aperture to be very large.

In all of the known methods mentioned above, it is difficult to achieve compactness, which is very important in field observation and measurement, especially for vehicle mounted systems.

An object of the present invention is to provide a beam splitter single-element for combining at least three optical apertures in order to permit compactness of optical or electro-optical devices to be simultaneously operated. Another object of the present invention is to provide a system including the novel beam splitter and a plurality of optical or electro-optical devices simultaneously receiving or transmitting electromagnetic radiation therethrough.

SUMMARY OF THE INVENTION

According to the present invention, there is provided a single-element beam splitter for splitting a beam of electromagnetic radiation passing therethrough into three beams. The beam splitter comprises a transparent window; a dichroic coating on one face of the transparent window and effective to reflect part of the spectral range of the electromagnetic radiation and to transmit the remainder therethrough; and a transmissive-type holographic grid bonded to the opposite face of the transparent window and effective to refract a narrow bandwidth of the electromagnetic radiation and to transmit the remaining electromagnetic radiation therethrough. The single-element beam splitter thus splits the beam of electromagnetic radiation into three components thereby enabling the optical apertures of three optical devices to be combined to one optical aperture with respect to the original beam of electromagnetic radiation.

Further features and advantages of the invention will be apparent from the description below.

BRIEF DESCRIPTION OF THE DRAWINGS

The invention is herein described, by way of example only, with reference to the drawings, wherein.

DESCRIPTION OF A PREFERRED EMBODIMENT

Figure 1:
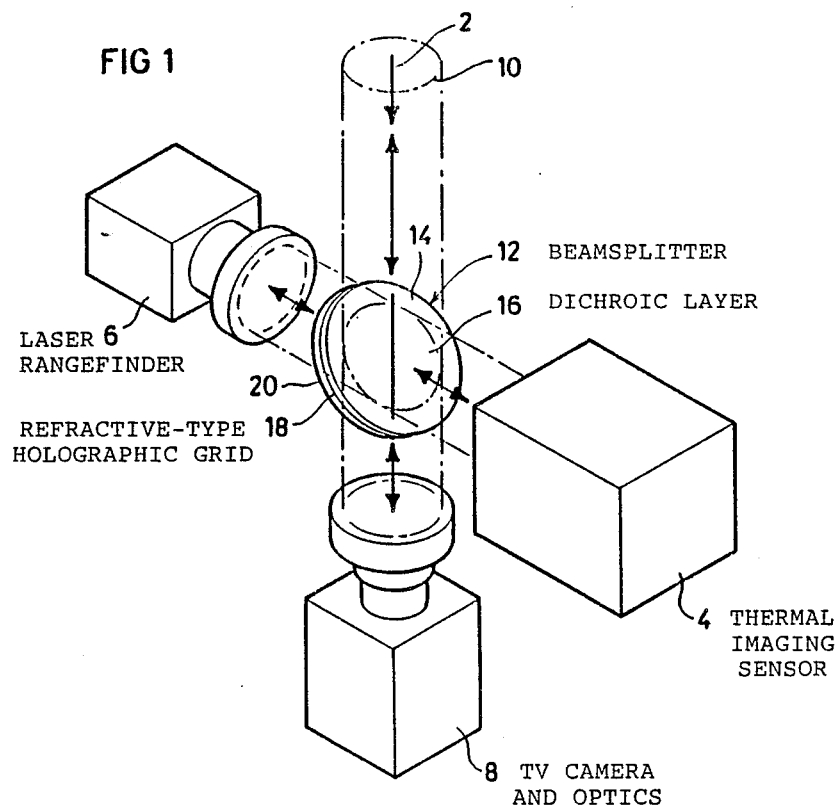
FIG. 1 is a three-dimensional view illustrating one form of system constructed in accordance with the present invention.

The system illustrated in the drawings is for use in field observation and/or measurement. The incoming electromagnetic radiation, in the form of a beam 2, is to be simultaneously received by three diverse devices, namely a thermal imaging sensor 4, a laser rangefinder 6, and a TV camera and optics 8. The system includes a common aperture 10 through which the electromagnetic radiation passes to impinge on a beam splitter 12, which is effective to direct different spectral portions of the radiation to (or from) the three devices 4, 6 and 8.

Beam splitter 12 includes a window 14 having a dichroic layer 16 effective to reflect a part of the spectral range of the received radiation to the aperture of device 4 and to transmit the remainder through window 14.

Bonded to the opposite face of transparent window 14 is a transmissive-type holographic grid 18 sandwiched between window 14 and a second window 20. Holographic grid 18 is effective to refract a narrow band of the received radiation to the aperture of device 6. The remainder of the radiation passes through the grid and through window 20 to the aperture of device 8.

It will thus be seen that the single-element beam splitter described above splits the beam of electromagnetic radiation into three components, thereby enabling the optical apertures of three optical devices to be combined to one optical aperture with respect to the beam of electomagnetic radiation.

Thus, when device 4 is a thermal imaging sensor, the dichroic layer 16 on window 14 would be selected to reflect the thermal part of the electromagnetic radiation spectrum to it; and where device 6 is a laser rangefinder, the holographic grid 18 would be selected to refract the appropriate wavelength of the laser from and to the laser. The TV camera 8, which receives the remainder of the electromagnetic radiation spectrum passing through both the dichroic layer 16 and the holographic grid 18, receives the remaining radiation for viewing by the TV camera 8.

Figure 2:
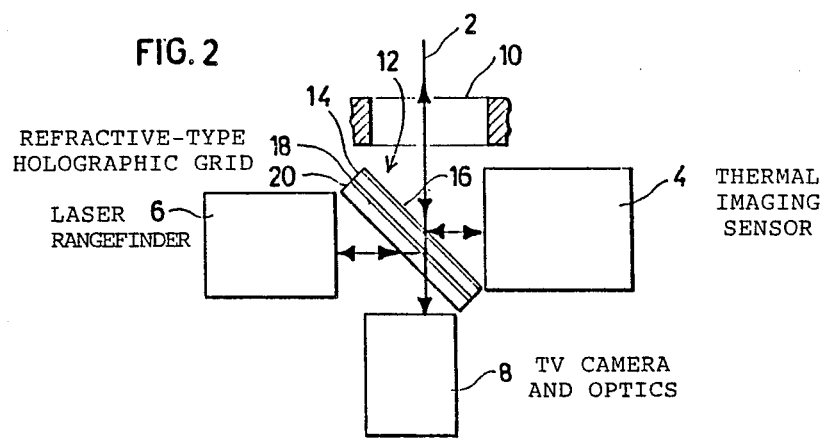
FIG. 2 is a side view more particularly illustrating the construction and operation of the beam splitter in the system of FIG. 1.

In the system illustrated in FIGS. 1 and 2, the electromagnetic radiation is shown to be bidirectional. This means that each of the electro-optical devices of the system may be receiving, transmitting, or both receiving and transmtting electromagnetic radiation via their respective apertures. For example, the laser range finder both transmits and receives. In all these applications, the beam splitter combines the three (or more) optical apertures into one aperture, which is basically not greater than that which is required for the largest aperture of the three devices. If more than three devices are to be operated simultaneously, additional holographic grids may be included to refract different bands at different angles to the respective devices.

The invention has been described with respect to one preferred embodiment, but it will be appreciated that many other variations, modifications and applications of the invention may be made.

What is claimed is:

1. A single-element beam splitter for splitting a beam of electromagnetic radiation passing therethrough, comprising:

a transparent window;

a dichroic coating on one face of said transparent window and effective to reflect part of the spectral range of the electromagnetic radiation and to transmit the remainder therethrough;

and a transmissive-type holographic grid bonded to the opposite face of said transparent window and effective to refract a narrow bandwidth of the electromagnetic radiation and to transmit the remaining electromagnetic radiation therethrough;

whereby said single-element beam splitter splits the beam of electromagnetic radiation into three components thereby enabling the optical apertures of three optical devices to be combined to one optical aperture with respect to said beam of electromagnetic radiation.

2. The beam splitter according to claim 1, wherein said transmissive-type grid is sandwiched between said window and a second window.

3. A field observation system including a beam splitter in accordance with claim 1, and at least three optical devices receiving and/or transmitting the different spectral parts of the electromagnetic radiation with respect to said window with said dichroic coating and grid.

4. The system according to claim 3, wherein the device using the spectral range reflected by the dichroic coating is a thermal imaging sensor.

5. The system according to claim 3, wherein the device using the part of the narrow band refracted by the grid is a laser range finder.

6. The system according to claim 3, wherein the device using the part of the electromagnetic radiation passing through the grid is a TV camera.

7. A field observation system comprising;

a single-element beam splitter for splitting a beam of electromagnetic radiation passing therethrough including;

a transparent window;

a dichroic coating on one face of said transparent window and effective to reflect part of the spectral range of the electromagnetic radiation and to transmit the remainder therethrough;

and a transmissive-type holographic grid bonded to the opposite face of said transparent window and effective to refract a narrow bandwidth of the electromagnetic radiation and to transmit the remaining electromagnetic radiation therethrough, whereby said singleelement beam splitter splits the beam of electromagnetic radiation into three components;

and three optical devices aligned with said beam splitter for receiving and/or transmitting the three beam components of different spectral parts of the electromagnetic radiation.

8. The system according to claim 7, wherein the device using the spectral range reflected by the dichroic coating is a thermal imaging sensor.

9. The system according to claim 7, wherein the device using the part of the narrow band refracted by the grid is a laser range finder.

10. The system according to claim 7, wherein the device using the part of the electromagnetic radiation passing through the holographic grid is a TV camera.

11. The system according to claim 7, wherein said grid is a transmissive type holographic grid sandwiched between said window and a second window.

* * * * *